United States Patent [19]

Rivera et al.

[11] Patent Number: 4,946,020

[45] Date of Patent: Aug. 7, 1990

[54] LOW FRICTION ESCALATOR HANDRAIL GUIDE

[75] Inventors: James A. Rivera, Bristol; Gerald Johnson, Farmington, both of Conn.

[73] Assignee: Otis Elevator Company, Farmington, Conn.

[21] Appl. No.: 386,314

[22] Filed: Jul. 28, 1989

[51] Int. Cl.[5] .......... B65G 15/00

[52] U.S. Cl. .......... 198/335

[58] Field of Search .......... 198/335, 337, 841

[56] References Cited

U.S. PATENT DOCUMENTS

| | | | |
|---|---|---|---|
| 1,186,551 | 6/1916 | Cobb | 198/337 |
| 2,028,358 | 1/1936 | Shonnard | 198/337 |
| 3,633,725 | 1/1972 | Smith | 198/337 |
| 3,712,447 | 1/1973 | Boltrek et al. | 198/335 |
| 3,981,118 | 9/1976 | Johnson et al. | 198/335 X |
| 3,989,133 | 11/1976 | Courson et al. | 198/335 |
| 3,991,877 | 11/1976 | Kraft et al. | 198/335 |
| 4,159,758 | 7/1979 | Courson | 198/335 |
| 4,488,631 | 12/1984 | Courson | 198/335 |
| 4,598,811 | 7/1986 | Hanano et al. | 198/335 |
| 4,658,946 | 4/1987 | Adrian et al. | 198/337 |
| 4,666,028 | 5/1987 | Saito et al. | 198/335 |
| 4,705,155 | 11/1987 | Kanamori | 198/335 |
| 4,809,840 | 3/1989 | Nakatani | 198/335 X |
| 4,842,122 | 6/1989 | Van Nort | 198/335 |

FOREIGN PATENT DOCUMENTS

| | | | |
|---|---|---|---|
| 1512084 | 2/1968 | France | 198/335 |
| 3788 | 1/1979 | Japan | 198/335 |

*Primary Examiner*—Joseph E. Valenza
*Assistant Examiner*—Cheryl L. Gastineau
*Attorney, Agent, or Firm*—William W. Jones

[57] ABSTRACT

The handrail guide is suitable for use on very thin escalator balustrades, such as are typically made of glass or the like. The handrail-contacting-track surface is formed from a low friction plastic material. The plastic track member is affixed to a mount base which clips onto the balustrade, and the track is reinforced by a recessed steel strip plate fastened directly to the base through the track.

5 Claims, 1 Drawing Sheet

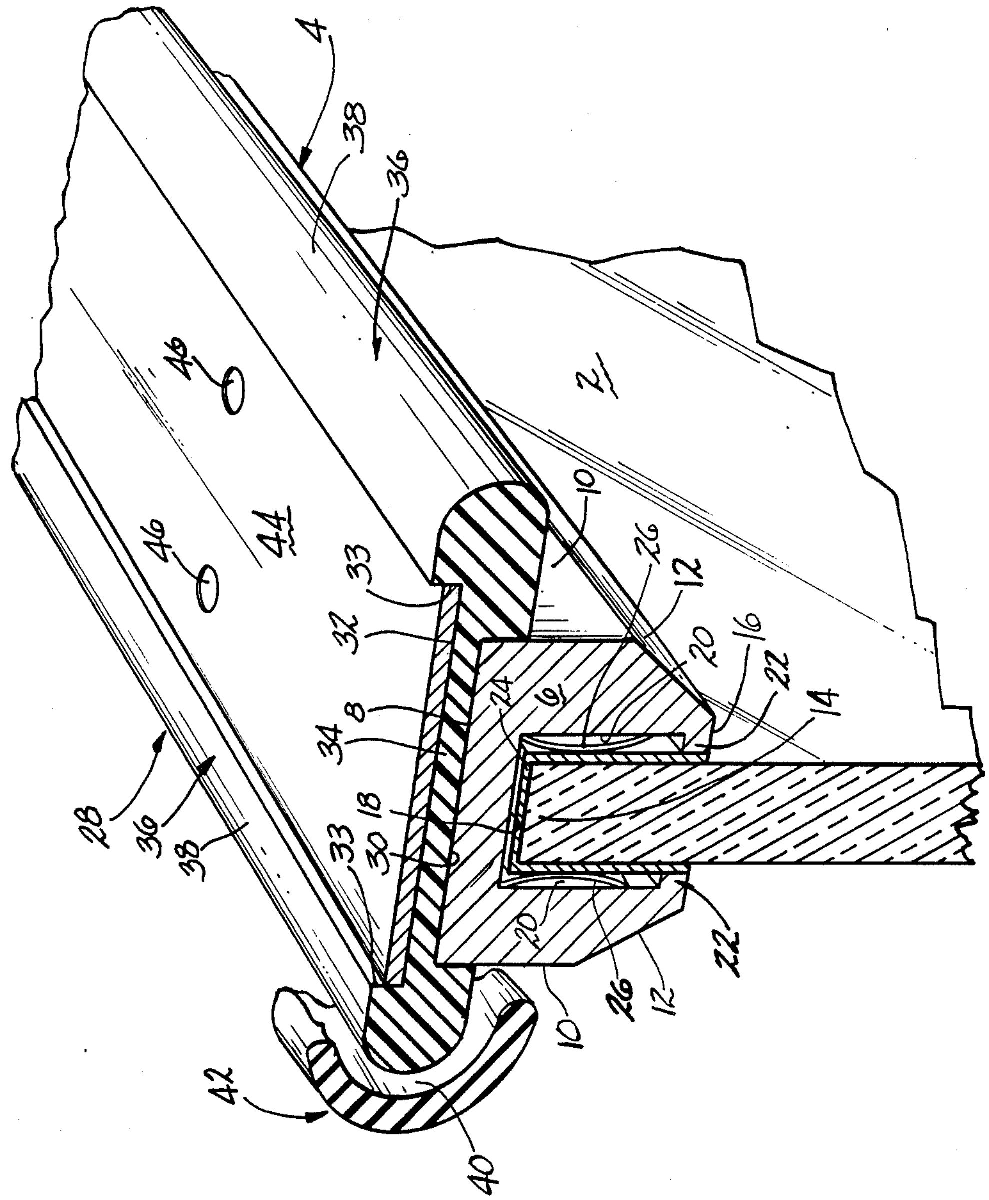

LOW FRICTION ESCALATOR HANDRAIL GUIDE

DESCRIPTION

1. Technical Field

This invention relates to an escalator handrail guide which is affixed to an escalator balustrade, and over which the moving handrail of the escalator slides. More particularly, this invention relates to an escalator handrail guide which has improved low friction characteristics.

2. Background Art

Newer more modern escalators frequently include thin transparent, or non-transparent, balustrades which may be made of glass or some other material. Such balustrades are used to increase the aesthetic appeal of the escalator assembly. These balustrades are typically substantially thinner than the width of the handrails which move over them, whereby suitable laterally enlarged guide rails must be mounted on the balustrade to support the handrails. Typical examples of such balustrade assemblies are shown in U.S. Pat. No. 2,028,358 granted Jan. 21, 1936 to H. W. Shonnard; U.S. Pat. No. 3,321,059 granted May 23, 1967 to C. J. Kroepel; U.S. Pat. No. 3,981,118 granted Sept. 21, 1976 to E. D. Johnson, et al; U.S. Pat. No. 3,989,133 granted Nov. 2, 1976 to I. C. Courson, et al; U.S. Pat. No. 3,991,877 granted Nov. 16, 1976 to J. K. Kraft, et al; U.S. Pat. No. 4,488,631 granted Dec. 18, 1984 to I. C. Courson; U.S. Pat. No. 4,658,946 granted Apr. 21, 1987 to W. Adrian, et al; U.S. Pat. No. 4,705,155 granted Nov. 10, 1987 to O. Kanamori; French U.S. Pat. No. 1,512,084 dated Feb. 21, 1967 to Otis Elevator Company; and British Patent Applications No. 2,104,471 to Hitachi Ltd. published Mar. 9, 1983; 2,143,194 to O&K published Feb. 6, 1985; and 2,152,002 to Mitsubishi Denki Kabushiki Kaisha, published July 31, 1985. One problem manifesting itself with such handrail-balustrade assemblies relates to reduction of frictional drag between the handrail and the handrail guide over which the handrail slides. The frictional drag problem is particularly acute in a curved escalator such as is shown in U.S. Pat. No. 4,809,840 granted Mar. 7, 1989 to H. Nakatani wherein the handrail is pulled laterally inwardly toward the center of its path of travel, as well as being pulled along its arcuate path of travel.

DISCLOSURE OF THE INVENTION

This invention relates to a handrail guide assembly which results in reduced frictional drag between the handrail and handrail guide, and which is suitable for use in conventional or curved escalator balustrade-handrail assemblies. The handrail guide assembly is clipped onto the top edge of the balustrade without requiring any rivets, bolts, screws, or the like, and without the need to drill any holes in the balustrade. The handrail-engaging track part of the guide assembly is formed from a low friction plastic extrusion, such as polyethylene or the like. The track extrusion part is laterally reinforced by a steel or the like metal strip which overlies the medial portion of the track and which is secured to an extruded metal base member by fasteners which pass through the reinforcing strip and the plastic track into the base member. The reinforcing strip is preferably recessed in the plastic track so that the handrail touches only the plastic track part of the guide assembly.

It is therefore an object of this invention to provide an improved low friction escalator handrail guide assembly for use on an escalator balustrade.

It is a further object of this invention to provide a handrail guide assembly of the character described which is laterally reinforced for added strength so as to render the guide assembly suitable for use in a curved escalator.

It is an additional object of this assembly to provide a handrail guide assembly of the character described which can be easily fitted onto the top of an escalator balustrade.

These and other objects and advantages of the invention will become more readily apparent to those skilled in the art from the following detailed description of a preferred embodiment thereof when taken in conjunction with the accompanying drawing which is a fragmented perspective sectional view of a balustrade and handrail assembly for an escalator.

BEST MODE FOR CARRYING OUT THE INVENTION

Referring to the drawing, the escalator balustrade is referenced by the numeral 2 and is formed from glass. The balustrade 2 may be rectilinear in plan view or curvilinear in plan view, depending on whether the escalator is a conventional or curved escalator. The handrail guide assembly 4 includes a base part 6 which has a flat top surface 8 bounded by downwardly depending sides 10 which intersect downwardly and inwardly converging chamfers 12. An upwardly extending longitudinal channel 14 is formed in the bottom wall 16 of the base member 6. The channel 14 has a flat top wall 18, parallel offset side walls 20 and a pair of converging lower flanges 22. The base 6 is preferably formed from an extrusion of aluminum. A gasket 24 is disposed on the upper part of the balustrade 2 which is contained in the channel 14. The side walls 20 of the channel 14 are outwardly offset from the gasket 24, while the base flanges 22 engage the gasket 24. Spring clips 26 are disposed in the gaps between the channel side walls 20 and the gasket 24 to provide a positive clamping force that secures the base 6 to the balustrade 2. A track member 28 preferably formed from a low friction extruded plastic such as polyethylene is mounted on the base 4. The track 28 has a groove 30 which fits snugly over the top surface 8 of the base 4, and extends part way down the side walls 10 of the base 4. A second groove 32 is formed in the top surface of the track 28. A medial web 34 separates the grooves 30 and 32 and overlies the top surface 8 of the base 4. Outwardly extending rounded arms 36 flank the medial web 34. The arms 36 have contoured outer sides 38 which are curved so as to generally conform to the shape of the inner side surface 40 of the handrail 42. A metal reinforcing plate 44 is disposed in the track groove 32 and extends outwardly to abut the side walls 33 of the groove 32. The reinforcing plate 44 is secured to the base 4 by means of screws 46 which pass through the plate 44 and track web 34 and are screwed into threaded holes in the base 4. The plate 44 thus serves to pin the track 28 to the base 4 and also to laterally reinforce and strengthen the handrail bearing arms 36 on the track 28. The plate 44 is recessed into the groove 32 so as not to contact the handrail 42 as the latter slides along the guide assembly.

It will be appreciated that the guide assembly of this invention is sturdy, provides low friction guiding of the handrail, and is laterally strengthened despite the fact that the handrail is in contact only with the plastic component of the guide assembly. The assembly is of simple construction and easily assembled and installed on an escalator balustrade. The track can be made of any low friction extrudable plastic, such as polyethylene, nylon, acetal, U.H.M.W. polymer or the like. Likewise the base is preferably made from an extrudable metal, although it could obviously be machined from bar stock if so desired.

Since many changes and variations of the disclosed embodiment of the invention may be made without departing from the inventive concept, it is not intended to limit the invention otherwise than as required by the appended claims.

What is claimed is:

1. A handrail guide assembly adapted to be mounted on the balustrade of an escalator, said guide assembly comprising:

(a) a metal base portion adapted to be fitted onto a top edge of the escalator balustrade;

(b) a handrail contacting and guiding track disposed on said base, said track being formed from a low coefficient of friction plastic material;

(c) a metal reinforcing strip mounted on a central portion of said track on the side thereof opposite said base whereby said track is sandwiched between said base and said strip; and (d) means securing said strip to said base through said track whereby said track is pinned to said base by said strip.

2. The handrail guide assembly of claim 1 wherein said track has first groove formed on one side thereof which is sized to snugly telescopingly receive an upper portion of said base, and a second groove formed on the opposite side of said track sized to snugly receive said strip, said second groove being of a depth which recesses said strip below handrail contacting surfaces of said track.

3. The handrail guide assembly of claim 2 wherein said track is formed with laterally outwardly extending arms which engage inner sides of the handrail and which provide the major contact surface between said guide assembly and the handrail.

4. The handrail guide assembly of claim 3 wherein said arms extend above sides of said strip sufficiently to prevent the handrail from contacting said strip.

5. An escalator handrail assembly comprising:

(a) a balustrade;

(b) a metal handrail guide assembly base mounted on said balustrade;

(c) a low friction plastic handrail guide track mounted on said base, said track having a first basal groove for receiving an upper part of said base; a second upper groove formed medially thereof; and lateral extending vertically thickened arms flanking said grooves;

(d) a metal reinforcing strip disposed in said second groove, said strip being recessed below said track arms;

e) means securing said strip to said base through said track whereby said track is pinned to said base by said strip; and (f) a handrail mounted on said track in sliding engagement therewith, said track arms being operable to prevent said handrail from contacting said base and said strip whereby low friction support for said handrail is provided with lateral reinforcement of said track being provided by said strip.

* * * * *